US012621576B2

(12) United States Patent
Lee et al.

(10) Patent No.: US 12,621,576 B2
(45) Date of Patent: May 5, 2026

(54) METHOD AND DEVICE FOR IRREVERSIBLE PRIVACY PROTECTION IN IMAGE ACQUISITION

(71) Applicant: TRIPLE WIN TECHNOLOGY(SHENZHEN) CO. LTD., Shenzhen (CN)

(72) Inventors: Ming-Hsun Lee, New Taipei (TW); Yen-Lin Peng, New Taipei (TW)

(73) Assignee: TRIPLE WIN TECHNOLOGY(SHENZHEN) CO. LTD., Shenzhen (CN)

( * ) Notice: Subject to any disclaimer, the term of this patent is extended or adjusted under 35 U.S.C. 154(b) by 339 days.

(21) Appl. No.: 18/225,247

(22) Filed: Jul. 24, 2023

(65) Prior Publication Data

US 2024/0223913 A1     Jul. 4, 2024

(30) Foreign Application Priority Data

Dec. 30, 2022     (CN) .......................... 202211739898.5

(51) Int. Cl.
| | |
|---|---|
| *H04N 5/335* | (2011.01) |
| *G02F 1/1343* | (2006.01) |
| *G02F 1/155* | (2006.01) |
| *H04N 23/55* | (2023.01) |
| *H04N 23/63* | (2023.01) |
| *H04N 23/75* | (2023.01) |

(52) U.S. Cl.
CPC ......... *H04N 23/75* (2023.01); *G02F 1/13439* (2013.01); *G02F 1/155* (2013.01); *H04N 23/55* (2023.01); *H04N 23/632* (2023.01)

(58) Field of Classification Search
CPC ....................................................... H04N 23/75
See application file for complete search history.

(56) References Cited

U.S. PATENT DOCUMENTS

| | | | | |
|---|---|---|---|---|
| 11,310,439 | B2 * | 4/2022 | Djakovic ................. | H04N 7/18 |
| 11,846,845 | B2 * | 12/2023 | Hsieh ................... | G02B 27/281 |
| 11,852,944 | B2 * | 12/2023 | Lee .......................... | G02F 1/155 |
| 12,192,605 | B2 * | 1/2025 | Reading ................. | G06V 40/23 |
| 2009/0305453 | A1 | 12/2009 | Yang et al. | |
| 2010/0194673 | A1 * | 8/2010 | Perrett ................ | H10F 39/8053 |
| | | | | 345/90 |
| 2012/0188415 | A1 * | 7/2012 | Johnson ............... | H04N 25/533 |
| | | | | 348/241 |
| 2013/0135505 | A1 * | 5/2013 | Yoshida .............. | H10F 39/8067 |
| | | | | 348/311 |

(Continued)

FOREIGN PATENT DOCUMENTS

| | | |
|---|---|---|
| TW | 200952161 A | 12/2009 |

*Primary Examiner* — Gary C Vieaux
(74) *Attorney, Agent, or Firm* — ScienBiziP, P.C.

(57) ABSTRACT

An image acquisition device includes an optical sensor and a dimmer. The optical sensor includes a photosensitive area configured to convert optical signal into image signal. The dimmer is on a side of the optical sensor that receives the optical signal. The dimmer completely covers the photosensitive area. The dimmer is configured for modulating intensity of the optical signal projected onto the optical sensor. The dimmer includes dimming blocks. Each dimming block is configured for modulating intensity of light projected onto a portion of the photosensitive area. An electronic device and an image acquisition method are also provided.

20 Claims, 7 Drawing Sheets

100

(56)         References Cited

U.S. PATENT DOCUMENTS

2014/0063049 A1*    3/2014    Armstrong-Muntner ....................
                                                                    H04N 23/611
                                                                        345/619
2019/0320099 A1*    10/2019    Sadahiro ................. G02B 5/201
2022/0334447 A1*    10/2022    Liu  ......................... G02F 1/163
2024/0160075 A1*    5/2024    Mei  ........................ C09K 11/06
2024/0248338 A1*    7/2024    Gao  ........................ C23C 14/14
2025/0015121 A1*    1/2025    Zhu  ....................... H10F 39/182

* cited by examiner

100

200

201

201a

400

METHOD AND DEVICE FOR IRREVERSIBLE PRIVACY PROTECTION IN IMAGE ACQUISITION

FIELD

The subject matter herein generally relates to an image acquisition device, an image acquisition method, and an electronic device having the image acquisition device.

BACKGROUND

A camera generally modulates captured images by digital image processing techniques, such as blurring or setting mosaic on face of a portrait, or blurring surrounding environment to protect privacy. However, the above processing methods are algorithm processing of images, which can be restored by reverse engineering, resulting in the inability to protect privacy.

Therefore, there is room for improvement in the art.

BRIEF DESCRIPTION OF THE DRAWINGS

Implementations of the present technology will now be described, by way of embodiments only, with reference to the attached figures.

DETAILED DESCRIPTION

Figure 1:
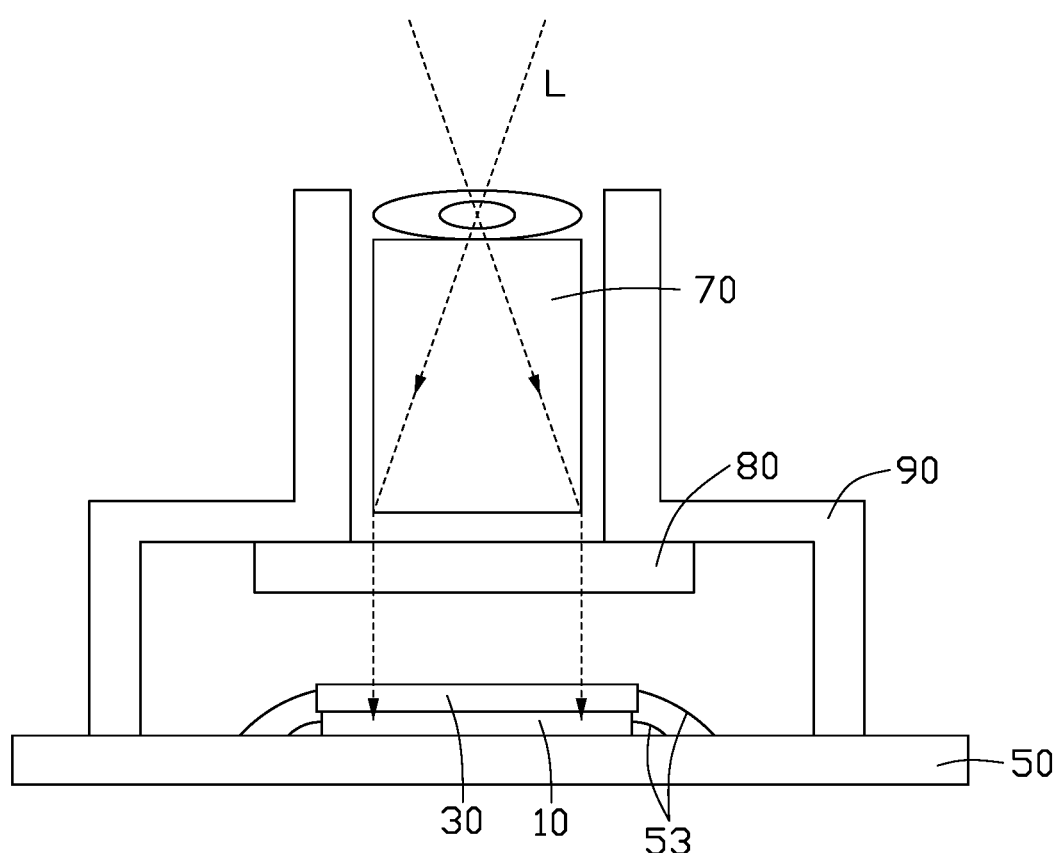
FIG. 1 is a schematic view of an image acquisition device according to an embodiment of the present disclosure.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein may be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

The term "coupled" is defined as coupled, whether directly or indirectly through intervening components, and is not necessarily limited to physical connections. The connection can be such that the objects are permanently coupled or releasably coupled. The term "comprising" when utilized, means "including, but not necessarily limited to"; it specifically indicates open-ended inclusion or membership in the so-described combination, group, series, and the like.

As shown in FIG. 1, the present disclosure provides an image acquisition device. The image acquisition device 100 includes an optical sensor 10 and a dimmer 30. The optical sensor 10 converts optical signal L into image signal. The dimmer 30 is on a side of the optical sensor 10 that receives the optical signal L, for modulating intensity of the optical signal L projected onto the optical sensor 10.

Figure 2:
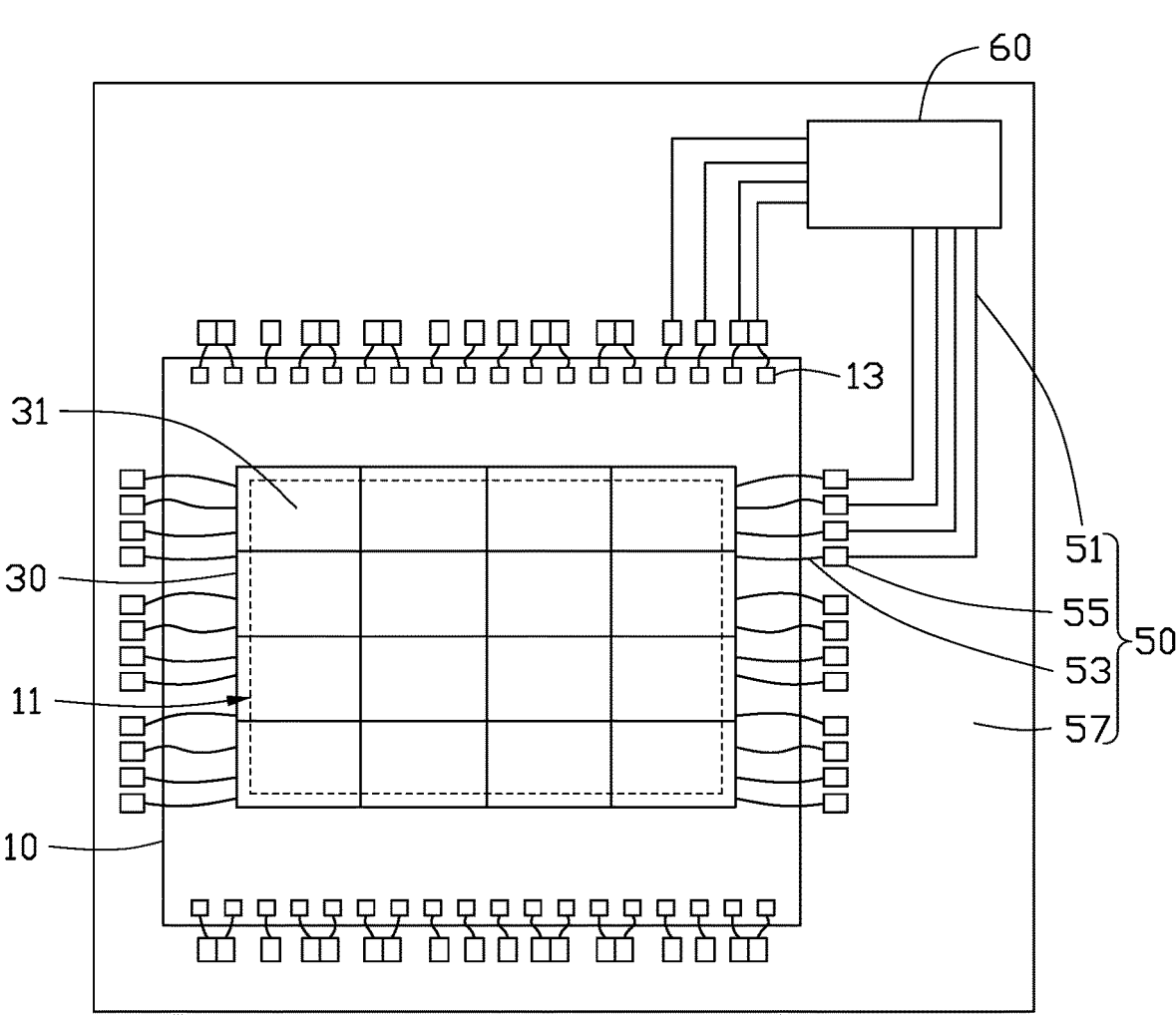
FIG. 2 is a top view of a partial of the image acquisition device.

As shown in FIG. 2, the optical sensor 10 includes a photosensitive area 11 for converting the light signal L into image signal. The dimmer 30 completely covers the photosensitive area 11. The dimmer 30 includes a plurality of dimming blocks 31. Each dimming block 31 modulates the intensity of light passing through one corresponding block. Each dimming block 31 can be independently controlled.

In this embodiment, as shown in FIG. 1 and FIG. 2, the image acquisition device 100 also includes a circuit board 50. The optical sensor 10 is between the circuit board 50 and the dimmer 30. The circuit board 50 includes a substrate 57 and circuit wires 51 on the substrate 57. The optical sensor 10 and the dimmer 30 are electrically connected to different circuit wires 51. Specifically, the optical sensor 10 is located on a side of the substrate 57 and is electrically connected to the circuit wires 51 on the circuit board 50, thereby transmitting the converted image signal by the circuit wires 51. The dimmer 30 is located on a side of the optical sensor 10 away from the circuit board 50, and is also electrically connected to the circuit wires 51 to modulate the optical signal L based on the electrical signal transmitted by the circuit wires 51.

In this embodiment, the optical sensor 10 can be either a charge coupled device (CCD) or a complementary metal oxide semiconductor (CMOS), or other image sensing elements. The optical sensor 10 can convert the intensity signal of the optical signal L into electrical signal by the photoelectric effect when receiving the optical signal L. The optical sensor 10 includes a plurality of photosensitive units (not shown) densely arranged to form a photosensitive area 11. Each photosensitive unit convert the optical signal L emitted from a portion of the image to be collected into electrical signal, thereby combining to form an image signal.

In this embodiment, the circuit board 50 includes the substrate 57, the circuit wires 51, connection wires 53, and connection pads 55. Specifically, the circuit board 50 can be a printed circuit board (PCB), the circuit wires 51 and connection pads 55 are printed on the substrate 57, thereby forming a circuit for connecting the optical sensor 10 to the dimmer 30. Both the optical sensor 10 and the dimmer 30 include a plurality of output ports 13, each output port 13 corresponds to one connection pad 55. Each output port 13 of the optical sensor 10 is electrically coupled to one corresponding connection pad 55 by one connection wire 53. Each output port 13 of the dimmer 30 is electrically coupled to one corresponding connection pad 55 by one connection wire 53. The connecting wire 53 can be gold wire or other conductive materials, and this disclosure does not limit this.

In this embodiment, the dimmer 30 includes a plurality of dimming blocks 31. Each dimming block 31 corresponds to a portion of the photosensitive area 11, and each dimming block 31 is electrically connected to one of the circuit wires 51. Each dimming block 31 corresponds to one photosensitive unit or several photosensitive units. Each dimming block 31 adjusts intensity of the light signal L to be received by the corresponding portion of the photosensitive area 11, thereby adjusting the brightness of the generated image signal in the corresponding area. Each dimming block 31 is electrically connected to at least one circuit wire 51, and different dimming blocks 31 is electrically connected different circuit wires 51, thereby achieving independent modulation of each dimming block 31.

Figure 3:
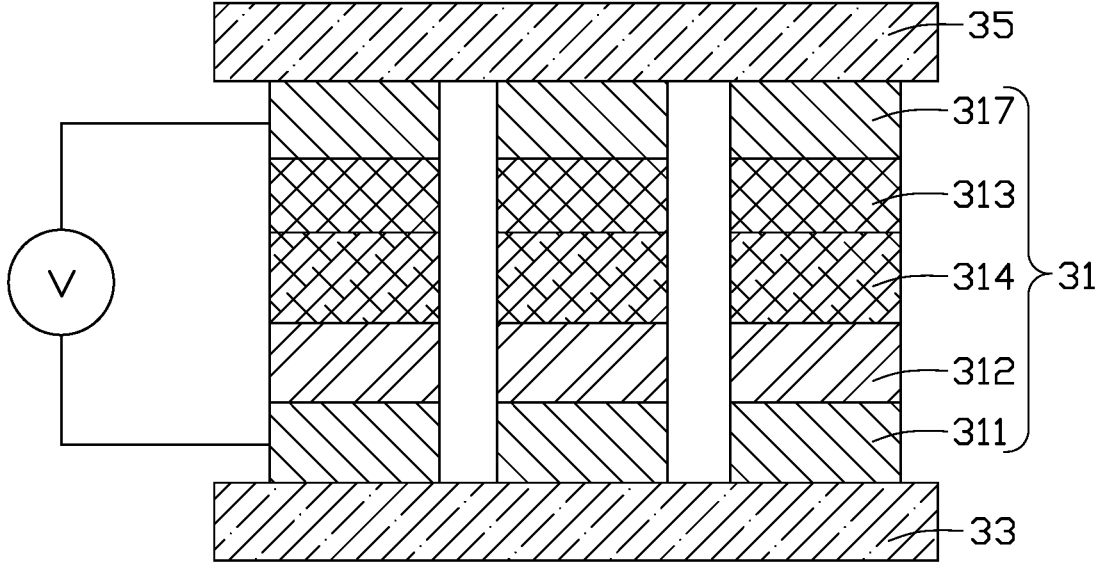
FIG. 3 is a cross-sectional view of a dimmer according to an embodiment of the present disclosure.

In this embodiment, as shown in FIG. 3, each dimming block 31 includes a first conductive layer 311, an ion storage layer 312, an electrolyte layer 314, an electrochromic layer 313, and a second conductive layer 317 arranged in sequence. FIG. 3 only shows a structure containing three dimming blocks 31. Both the first conductive layer 311 and the second conductive layer 317 are electrically connected to one of the circuit wires 51 of the circuit board 50, respectively, to generate a voltage difference between the first conductive layer 311 and the second conductive layer 317, thereby causing the electrochromic layer 313 to change color. Specifically, the ion storage layer 312 is configured to store a certain amount of ions and electrons, the electrolyte layer 314 is configured to block electrons and allow ions to pass through. The electrochromic layer 313 changes color after receiving ions, thereby absorbing photons. The more ions the electrochromic layer 313 receives, the stronger its ability to absorb photons, that is, the lower the intensity of light passing through the electrochromic layer 313. The electrochromic layer 313 is in a transparent state and its ability to absorb light is the lowest when not powered on. As a voltage difference between the first conductive layer 311 and the second conductive layer 317 increases, the ions in the ion storage layer 312 gradually transfer to the electrochromic layer 313, causing the electrochromic layer 313 to start absorbing light, thereby achieving modulation of the light signal L. The electrochromic layer 313 may include electrochromic materials such as tungsten oxide ($WO_3$) or nickel oxide, as well as other electrochromic materials.

In this embodiment, the first conductive layer 311 and the second conductive layer 317 are made of transparent conductive materials, such as indium tin oxide (ITO), graphene transparent conductive film, etc., which is not limited in this disclosure.

In this embodiment, the dimmer 30 also includes a first transparent substrate 33 and a second transparent substrate 35. The dimming blocks 31 are arranged between the first transparent substrate 33 and the second transparent substrate 35. Specifically, the first transparent substrate 33 is located on a side of the first conductive layer 311 away from the ion storage layer 312, and the second transparent substrate 35 is located on a side of the second conductive layer 317 away from the electrochromic layer 313. The first conductive layers 311 arranged on the first transparent substrate 33 are respectively connected to one corresponding connection pad 55 by connection wires 53, thereby being electrically connected to the circuit wire 51. The first conductive layers 311 can be connected to the connection wires 53 by transparent conductive wires on the first transparent substrate 33, or directly connected to the connection wires 53. The second conductive layers 317 arranged on the second transparent substrate 35 are respectively connected to one corresponding connection pad 55 by connection wires 53, thereby being electrically connected to the circuit wire 51. The second conductive layers 317 can be connected to the connecting line 53 by transparent conductive wires on the second transparent substrate 35, or directly connected to the connection wires 53.

In this embodiment, the first transparent substrate 33 and the second transparent substrate 35 can be made of transparent material such as glass or plastic, which not only carry the dimming blocks 31 but also protect the dimming blocks 31.

Figure 4:
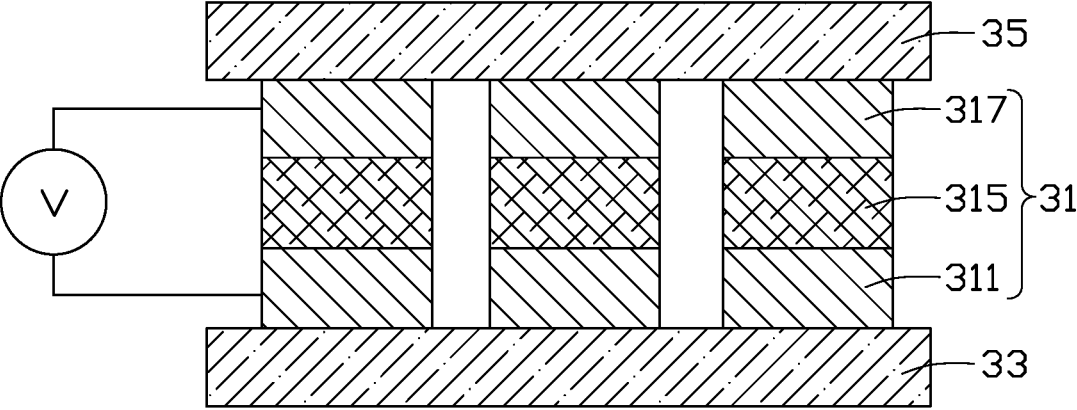
FIG. 4 is a cross-sectional view of a dimmer according to another embodiment of the present disclosure.

In other embodiments, as shown in FIG. 4, the dimming block 31 includes a first conductive layer 311, a second conductive layer 317, and a liquid crystal layer 315 between the first conductive layer 311 and the second conductive layer 317. The first conductive layer 311 and the second conductive layer 317 are electrically connected to different circuit wires 51 to generate a voltage difference at opposite ends of the liquid crystal layer 315, thereby switching the liquid crystal layer 315 between a transparent state and a dark state. The dimming block 31 can also modulate the optical signal L by setting the liquid crystal layer 315. The liquid crystal layer 315 includes liquid crystal molecules (not shown). When the voltage difference between the opposite ends of the liquid crystal layer 315 is zero, the liquid crystal molecules in the liquid crystal layer 315 are irregularly arranged. At this time, the light signal L is scattered when passing through the liquid crystal layer 315, causing the light signal L to not pass through the liquid crystal layer 315, that is the liquid crystal layer 315 is in a dark state. When a certain voltage difference is applied at opposite ends of the liquid crystal layer 315, liquid crystal molecules in the liquid crystal layer 315 are arranged in a regular manner under an electric field, making the liquid crystal layer 315 to be transparent, and the light signal L can pass through the liquid crystal layer 315. By switching the liquid crystal layer 315 to be a black state or a transparent state, the intensity and clarity of the light signals L received by the optical sensor 10 can be controlled. Specifically, a regularity of the arrangement of liquid crystal molecules in the liquid crystal layer 315 will affect the scattering degree of the light signal L, thereby affecting the intensity and clarity of the light signal L.

In this embodiment, as shown in FIG. 2, the image acquisition device 100 also includes a controller 60. FIG. 2 only shows some circuit wires 51. The controller 60 is connected to each circuit wire 51. The controller 60 is electrically connect to the optical sensor 10 and the dimmer 30 by the circuit wires 51, thereby receiving the image signal transmitted by the optical sensor 10 and sending controlling signal for modulating the optical signal L to the dimmer 30. For example, the controller 60 can first receive the image signal transmitted by the optical sensor 10 and display it as a preview image. The user can select areas to be dimmed based on the preview image by pre-set parameters (such as dimming an area higher than a certain brightness value) or manual confirmation (such as directly selecting an area to be dimmed by an external interaction device). The controller 60 sends control signals to the dimmer 30 based on the set parameters or manually selected areas. The controller 60 can be a chip integrated on the circuit board 50 or an independent control device such as a central processing unit.

In this embodiment, the controller 60 can independently control the voltage received by each dimming block 31, thereby controlling a transmittance of the dimming block 31 to the optical signal L. For example, each dimming block 31 can be set to be fully transparent, partially transparent, or opaque state, allowing a portion of the captured image to correspond to any dimming block 31 can change brightness. The controller 60 can simultaneously adjust transmittance of the plurality of dimming blocks 31, resulting in a decrease in an overall transmittance of the light signal L. That is, a decrease in the intensity of the light signal L reaching the optical sensor 10, achieving an approximate effect of adjusting the aperture. The controller 60 can also reduce transmittance of a part of the plurality of dimming blocks 31, so that the image signal converted by the optical sensor 10 has a high dynamic range, which can avoid situations where the overall contrast of the image is low due to overexposure (such as shooting the sun or shooting lights at night).

Please refer to FIG. 1, the image acquisition device 100 also includes a lens 70, a filter 80, and a bracket 90. The lens 70 focuses light emitted from the image to be collected into the optical signal L. The filter 80 filters out infrared band light in the optical signal L. The bracket 90 is used to support the circuit board 50, the lens 70, and the filter 80.

The image acquisition device 100 is equipped with the dimmer 30 including a plurality of dimming blocks 31 and each dimming block 31 corresponds to a portion of the photosensitive area 11. By independently adjusting transmittance of each dimming block 31 to the light signal L, the collected image does not need to be adjusted by algorithms, and adjusted effects can be directly achieved during a stage of converting the light signal L into the image signal, such as partial occlusion or partial blurring, overall filtering, and slowing down overexposure. For example, by setting some dimming block 31 to be completely opaque or to pass through scattered light signal L, partial occlusion or partial virtualization can be achieved. By setting each dimming block 31 to transmit a portion of the light signal L, overall light filtering can be achieved. By reducing transmittance of the dimming blocks 31 in areas with higher brightness to the light signal L, it is possible to slow down overexposure. In particular, it can prevent the area to be occluded from restoring by reverse engineering, which strengthens privacy protection.

Figure 5:
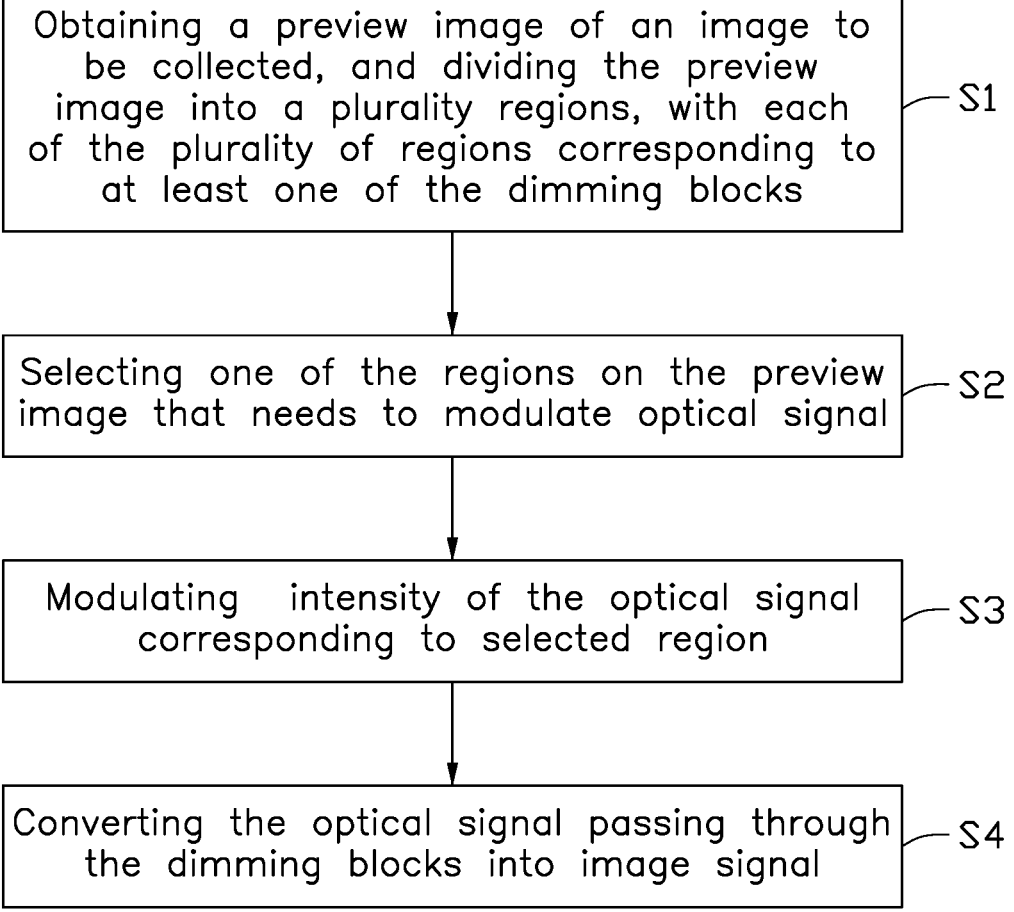
FIG. 5 is a flowchart of an image acquisition method according to an embodiment of the present disclosure.

As shown in FIG. 5, the present disclosure also provides an image acquisition method using the image acquisition device. The image acquisition method includes following steps.

Step S1: Obtaining a preview image of an image to be collected, and dividing the preview image into a plurality of regions, with each region corresponding to at least one dimming block.

Step S2: Selecting the region on the preview image that needs to modulate the optical signal.

Step S3: Modulating the intensity of the optical signal corresponding to the selected region.

Step S4: Converting the optical signal passing through the dimmer into image signal.

Figure 6:
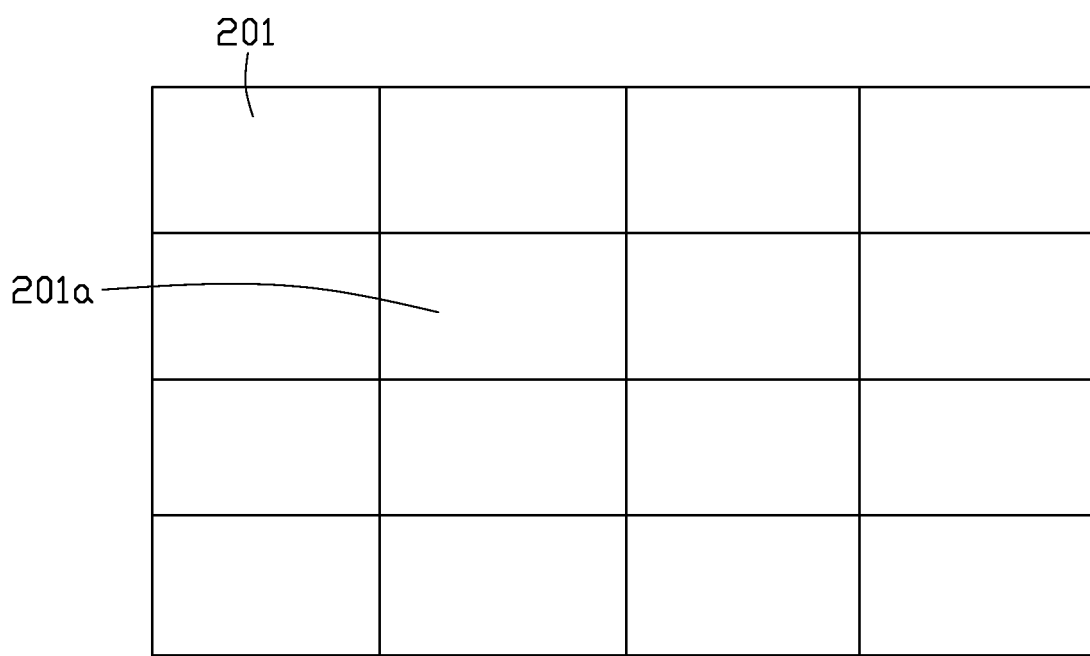
FIG. 6 is a block diagram of the image to be collected according to an embodiment of the present disclosure.

In this embodiment, as shown in FIG. 6, the Step S1 also includes displaying the captured image 200. Specifically, a display screen can be provided to display the captured image 200, in order to facilitate setting the regions 201. The divided regions 201 can correspond to one dimming block 31 or several dimming blocks 31. The regions 201 can have a same shape or set to have different shapes as needed. For example, when shooting a portrait, the portrait and background can be divided into two different regions 201.

In this embodiment, the step S3 includes blocking the optical signal L corresponding to the selected region 201a. Specifically, the dimming block 31 corresponding to the selected region 201a can be set so that the light signal L cannot pass through the corresponding dimming block 31, thereby causing the captured image 200 to have no image information at the position of the region 201a. By setting a distribution of the regions 201a, privacy protection can be achieved, such as blocking face when taking a portrait, or blocking the environment behind the portrait to avoid disclosing location information.

In another embodiment, the step S3 includes reducing intensity of the optical signal L corresponding to the selected region 201a. Specifically, the dimming block 31 corresponding to the selected region 201a can be set to reduce the intensity of the light signal L passing through the corresponding dimming block 31, resulting in a lower brightness of the captured image 200 at the position of region 201a. By setting the distribution of the regions 201a, high dynamic distribution photography can be achieved to avoid overexposure during shooting.

In another embodiment, the step S3 includes simultaneously adjusting the intensity of a portion of the optical signal L corresponding to each region 201. Specifically, all dimming blocks 31 can be adjusted simultaneously to reduce the overall brightness of the captured image 200, achieving a filter like effect.

The image acquisition method in this disclosure divides the image 200 to be captured into a plurality of regions 201 by providing a dimmer, and modulates the intensity of the corresponding part of the optical signal L for each region 201. The adjusted effect can be directly achieved during a stage of converting the optical signal L into the image signal, such as partial occlusion or partial blurring, overall filtering, and slowing down overexposure. In particular, it can prevent from restoring the area to be covered by reverse engineering, which strengthens privacy protection.

Figure 7:
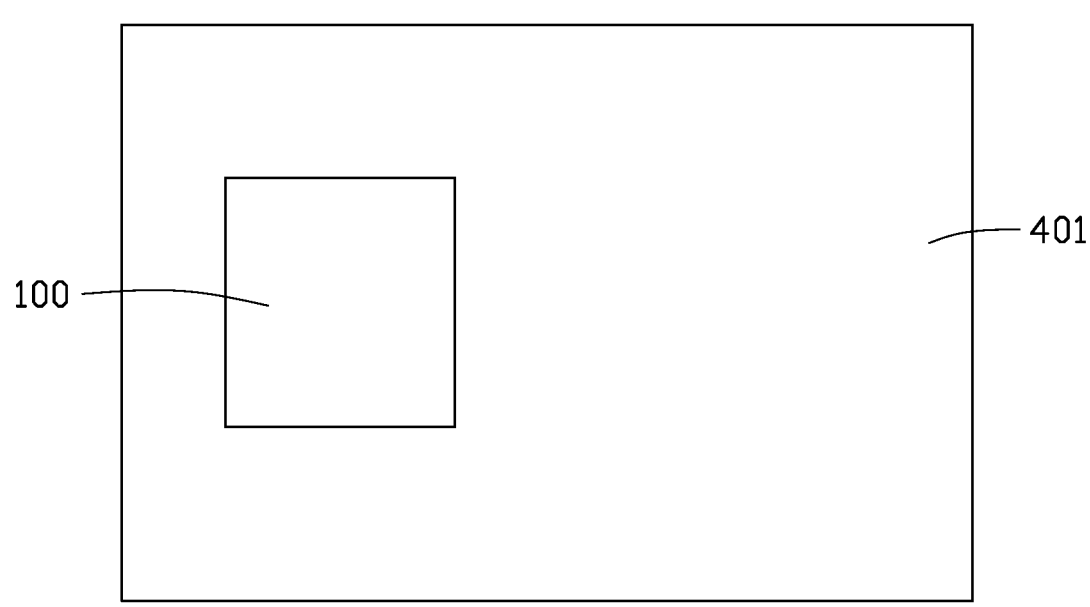
FIG. 7 is a schematic view of an electronic device according to an embodiment of the present disclosure.

Please refer to FIG. 7, the present disclosure also provides an electronic device 400 having the above image acquisition device 100. The electronic device 400 includes a body 401 and the image acquisition device 100 installed inside the body 401. The electronic device 400 can be a mobile phone, a personal digital assistant, a laptop, a monitor, or a digital camera, etc.

It is to be understood, even though information and advantages of the present embodiments have been set forth in the foregoing description, together with details of the structures and functions of the present embodiments, the disclosure is illustrative only; changes may be made in detail, especially in matters of shape, size, and arrangement of parts within the principles of the present embodiments to the full extent indicated by the plain meaning of the terms in which the appended claims are expressed.

What is claimed is:

1. An image acquisition device comprising:
   a circuit board comprising first connection wires and first connection pads;
   an optical sensor, the optical sensor comprising a photosensitive area configured to convert an optical signal into an image signal; and
   a dimmer on a side of the optical sensor that receives the optical signal, the dimmer covering the photosensitive area,
   wherein along a thickness direction of the image acquisition device, a projection of the dimmer does not overlap with the first connection pads, the dimmer is electrically connected to the first connection pads by the first connection wires, the dimmer comprises a plurality of dimming blocks, and an opaqueness, to the optical signal, of each of the plurality of dimming blocks is variable, in response to a dimming block of the plurality of dimming blocks is controlled to 100% opaque to the optical signal, none of the optical signal is transmitted through a target portion of the photosensitive area, and no image information of the target portion is projected.

2. The image acquisition device of claim 1, wherein the optical sensor is between the circuit board and the dimmer, the circuit board further comprises a controller and circuit wires, and the optical sensor and the dimmer are electrically connected to the controller by different circuit wires.

3. The image acquisition device of claim 2, wherein each of the plurality of dimming blocks is independently controlled by the controller and electrically connected to the controller by different circuit wires.

4. The image acquisition device of claim 3, wherein each of the plurality of dimming blocks comprises a first conductive layer, a second conductive layer, and an electrochromic layer between the first conductive layer and the second conductive layer, the first conductive layer and the second conductive layer are configured to be applied with different voltages by the circuit wires, and the electrochromic layer is configured to change color under a voltage difference between the first conductive layer and the second conductive layer.

5. The image acquisition device of claim 4, wherein both the first conductive layer and the second conductive layer are made of transparent conductive materials.

6. The image acquisition device of claim 4, wherein each of the plurality of dimming blocks further comprises an ion storage layer between the first conductive layer and the electrochromic layer, and an electrolyte layer between the ion storage layer and the electrochromic layer, the ion storage layer is configured to store a certain amount of ions and electrons, and the electrolyte layer is configured to block electrons and allow ions to pass through.

7. The image acquisition device of claim 3, wherein the controller is configured to independently control a voltage applied to each of the plurality of dimming blocks, such that the opaqueness of each of the plurality of dimming blocks to the optical signal is varied.

8. The image acquisition device of claim 2, wherein each of the plurality of dimming blocks comprises a first conductive layer, a second conductive layer, and a liquid crystal layer between the first conductive layer and the second conductive layer, the first conductive layer and the second conductive layer are configured to be applied with different voltages by the circuit wires, and the liquid crystal layer is configured to switch between a transparent state and a dark state under a voltage difference between the first conductive layer and the second conductive layer.

9. The image acquisition device of claim 8, wherein both the first conductive layer and the second conductive layer are made of transparent conductive materials.

10. The image acquisition device of claim 1, wherein the dimmer further comprises a first transparent substrate and a second transparent substrate, and the plurality of dimming blocks is arranged between the first transparent substrate and the second transparent substrate.

11. The image acquisition device of claim 1, wherein the first connection wires are gold wires.

12. An electronic device comprising:

a body;

an image acquisition device in the body; the image acquisition device comprising:

a circuit board comprising first connection wires, and first connection pads;

an optical sensor, the optical sensor comprising a photosensitive area configured to convert an optical signal into an image signal; and a dimmer on a side of the optical sensor that receives the optical signal, the dimmer completely covering the photosensitive area, wherein along a thickness direction of the image acquisition device, a projection of the dimmer does do not overlap with the first connection pads, the dimmer is electrically connected to the first connection pads by the first connection wires, the dimmer comprises a plurality of dimming blocks, and an opaqueness, to the optical signal, of each of the plurality of dimming blocks is variable, in response to a dimming block of the plurality of dimming blocks is controlled to 100% opaque to the optical signal, none of the optical signal is transmitted through a target portion of the photosensitive area, and no image information of the target portion is projected.

13. The electronic device of claim 12, wherein the optical sensor is between the circuit board and the dimmer, the circuit board further comprises a controller and circuit wires, and the optical sensor and the dimmer are electrically connected to the controller by different circuit wires.

14. The electronic device of claim 13, wherein each of the plurality of dimming blocks is independently controlled by the controller and electrically connected to the controller by different circuit wires.

15. The electronic device of claim 14, wherein each of the plurality of dimming blocks comprises a first conductive layer, a second conductive layer, and an electrochromic layer between the first conductive layer and the second conductive layer, the first conductive layer and the second conductive layer are configured to applied with different voltages by the circuit wires; the electrochromic layer configured to change color under a voltage difference between the first conductive layer and the second conductive layer, and both the first conductive layer and the second conductive layer are made of transparent conductive materials.

16. The electronic device of claim 15, wherein each of the plurality of dimming blocks further comprises an ion storage layer between the first conductive layer and the electrochromic layer, and an electrolyte layer between the ion storage layer and the electrochromic layer, the ion storage layer is configured to store a certain amount of ions and electrons, and the electrolyte layer is configured to block electrons and allow ions to pass through.

17. The electronic device of claim 14, wherein each of the plurality of dimming blocks comprises a first conductive layer, a second conductive layer, and a liquid crystal layer between the first conductive layer and the second conductive layer, the first conductive layer and the second conductive layer are configured to be applied with different voltages by the circuit wires; the liquid crystal layer configured to switch between a transparent state and a dark state under a voltage difference between the first conductive layer and the second conductive layer, and both the first conductive layer and the second conductive layer are made of transparent conductive materials.

18. The electronic device of claim 14, wherein the controller is configured to independently control a voltage applied to each of the plurality of dimming blocks, such that the opaqueness of each of the plurality of dimming blocks to the optical signal is varied.

19. The electronic device of claim 12, wherein the dimmer further comprises a first transparent substrate and a second transparent substrate, and the plurality of dimming blocks is arranged between the first transparent substrate and the second transparent substrate.

20. An image acquisition method comprising:

obtaining a preview image of an image to be collected, and dividing the preview image into a plurality of regions, each of the plurality of regions corresponding to at least one dimming block;

selecting at least one target region from the plurality of regions on the preview image;

controlling a voltage applied to corresponding dimming blocks of the at least one dimming block corresponding to the at least one target region to change opaqueness of the corresponding dimming block to an optical signal projected onto the at least one dimming block, wherein in response to the opaqueness of the corresponding dimming block to the optical signal is controlled to be 100%, none of the optical signal is transmitted through the at least one target region and no image information, of the image to be collected, corresponding to the at least one target region is projected; and converting the optical signal transmitted through the plurality of dimming blocks into an image signal.

* * * * *